United States Patent [19]

Ngo

[11] 3,953,886
[45] Apr. 27, 1976

[54] PLANAR RASTER SCAN DISPLAY WITH GAS DISCHARGE SHIFT REGISTERS

[75] Inventor: Peter Dinh-Tuan Ngo, Colts Neck, N.J.

[73] Assignee: Bell Telephone Laboratories, Incorporated, Murray Hill, N.J.

[22] Filed: Nov. 4, 1974

[21] Appl. No.: 520,614

[52] U.S. Cl. .................. 358/56; 178/7.3 D; 313/188; 315/169 TV
[51] Int. Cl.² ............................. H04N 5/44
[58] Field of Search ........... 358/59, 56; 178/7.3 D; 315/169 TV; 313/188; 340/324 M

[56] References Cited
UNITED STATES PATENTS

| | | | |
|---|---|---|---|
| 3,733,435 | 5/1973 | Chodil | 315/169 TV |
| 3,765,011 | 10/1973 | Sawyer | 178/7.3 D |
| 3,771,008 | 11/1973 | Chen | 178/7.3 D |
| 3,798,502 | 3/1974 | Ngo | 315/169 TV |
| 3,821,721 | 6/1974 | Hughes | 315/169 TV |
| 3,863,023 | 1/1975 | Schmersal | 315/169 TV |
| 3,866,209 | 2/1975 | Weimer | 178/7.3 D |

*Primary Examiner*—Howard W. Britton
*Assistant Examiner*—Michael A. Masinick
*Attorney, Agent, or Firm*—W. Ryan

[57] ABSTRACT

A two-dimensional planar display device includes a plurality of plasma discharge shift registers positioned along rows of a display matrix. An additional shift register positioned along one column at the edge of the display matrix causes a plasma discharge to be transferred to the beginning of each successive row shift register. By transferring a discharge along each position in successive rows, a discharge is propagated in a two-dimensional scanned manner over the face of the display matrix. By suitably modifying the level of the propagating signals in accordance with an applied video signal, the brightness of the scanned discharge is modulated to produce a variable gray scale image.

21 Claims, 7 Drawing Figures

RASTER SCAN

RASTER SCAN

PLANAR RASTER SCAN DISPLAY WITH GAS DISCHARGE SHIFT REGISTERS

BACKGROUND OF THE INVENTION

1. Field of the Invention

The present invention relates to display devices, and more particularly to plasma discharge display devices. Still more particularly, the present invention relates to apparatus and methods for generating a two-dimensional scanned plasma discharge display system suitable for generating TV-like images.

2. Prior Art

Recent years have witnessed the greatly increased use of arrays of plasma discharge devices for generating data displays. For example, U.S. Pat. Nos. 3,559,190 issued to D. L. Bitzer et al. on Jan. 26, 1971 and 3,499,167 issued to T. C. Baker et al. on Mar. 3, 1970 illustrate a typical form of plasma display device, commonly called the plasma panel. Standard plasma panel configurations include a matrix array of plasma cells defined by the overlap of respective pluralities of horizontal and vertical (row and column) electrodes. By using standard half-select addressing techniques, it is possible to write or erase any particular plasma cell. The advantages of such plasma panel systems follow in large part from the self-memory characteristic of the plasma cells. Thus, while information-bearing signals are necessary to write and erase information in particular cells, no additional information is required to maintain a display once established. Rather, only periodic non-information-bearing sustain signals are required.

One disadvantage of the most common plasma panel configurations is that, in general, it is possible only to display binary information, i.e., "on" or "off" conditions of plasma cells. Thus, the potential for displaying information of varying intensity such as might be associated with standard television displays, has not generally been possible using standard plasma panels.

Some attempts have, however, been made to generate gray level displays using modified arrangements of standard plasma panel structures. For example, Ngo, "A Multiple Intensity Plasma Display with Internal Memory," *Proceedings of the S.I.D.*, Vol. 13, No. 1, first quarter 1972, pages 21–25 illustrates one technique for generating gray scale in a plasma panel system. See also, U.S. Pat. No. 3,626,241 issued Dec. 7, 1971 to Ngo. The complexity involved in generating the multiple images described in the last-mentioned paper is, however, not justified in many applications. Thus, for example, approximately 50 percent more drive circuitry (as compared with standard panels) is typically required for the gray scale plasma panel system described in the above-cited Ngo paper. When it is considered that a major objection to present two-level (on-off) plasma panels is the need for rather complex drive circuitry, it can be appreciated that any additional complexity will be tolerated only with great reluctance.

Other attempts to introduce gray scale operation of a plasma panel include that described in U.S. Pat. No. 3,735,182 issued May 22, 1973 to J. J. Dalton, et al. which requires additional conductor patterns, each having a different resolution. U.S. Pat. Nos. 3,742,483 issued June 26, 1973 to J. A. Ogle; 3,654,388 issued Apr. 4, 1972 to H. G. Slottow, et al.; and 3,788,673 issued Dec. 11, 1973 to M. E. Eisenberg, et al. describe a plasma panel including means for modulating the amplitude and/or duration of cell current, thereby varying cell brightness. Each of these described systems requires at least a degree of complexity in panel fabrication and drive circuitry equal to that for bilevel (on/off) plasma panels.

While much emphasis has been placed in prior art plasma panel systems on the matrix arrangement of rows and columns of individual plasma cells, some effort has been directed to producing more integral structures. Thus, for example, in U.S. Pat. No. 3,781,600 issued Dec. 25, 1973 to W. E. Coleman et al., there is described a plasma device for transferring a discharge linearly along a prescribed path, i.e., in a manner analogous to transferring signals representative of digital information in a linear shift register. The structure described in the Coleman et al. patent has been generalized to a two-dimensional structure as described in U.S. Pat. No. 3,775,764 issued Nov. 27, 1973 to J. P. Gauer. Another plasma discharge shifting device is described in U.S. Pat. No. 3,795,908 issued Mar. 5, 1974 to A. W. McDowell et al.

The structure described in the last-mentioned Coleman et al., Gauer, and McDowell et al. patents will be seen to share with plasma panels of the type described in the earlier-mentioned Bitzer et al. and Baker et al. patents, the characteristic of individual pluralities of location-defining electrodes positioned on opposite sides of a cavity containing an illuminable inert gas. One important limitation of all such two-sided structures is the need for accurate registration of cell-defining electrodes to ensure the establishment and/or transfer of a discharge at the respective cells. If rather close tolerances in physical structure are not observed, undue burdens are placed on the requirements for the various drive and sustain signals. Inability to reliably reproduce physical structure and electrical characteristics of various of the plasma devices using the multilevel "sandwich" panel construction has resulted in low manufacturing yield and attendant high cost.

One solution for improving the reproducibility of structures for realizing plasma discharge sites is described in U.S. Pat. Nos. 3,646,384, 3,666,981, and 3,719,940 issued to F. M. Lay on Feb. 29, 1972, May 30, 1972, and Mar. 6, 1973, respectively. The structure described in the Lay patents is essentially planar, thereby avoiding many of the alignment and registration problems inherent in sandwich-type panels. An improved version of the single substrate configuration is described in U.S. Pat. application Ser. No. 444,380 filed Feb. 21, 1974 by G. W. Dick et al. The structure described in the Dick et al. application and the various Lay patents is also characterized by selection of particular cells by coincident current techniques.

In my earlier invention described in U.S. Pat. No. 3,798,502 issued Mar. 19, 1974 (herreinafter the '502 patent), I provide for a planar gas discharge shift register having simplified gas cell definition and greatly facilitated discharge transfer characteristics. My copending U.S. Pat. application Ser. No. 520,613 entitled "Plasma Discharge Shift Registers," filed of even date herewith (hereinafter the Ngo application) describes further modifications to the invention covered by the '502 patent. To simplify the present disclosure, both the '502 patent and the Ngo application are hereby incorporated by reference in the present application.

While improved plasma shift register structures are disclosed in the '502 patent and the Ngo application, neither provides explicitly for a two-dimensional interconnection to provide TV-like displays. Further, neither of these last-mentioned references nor other prior art disclosures teach the incorporation in a shift register structure of a gray scale capability such as is required for standard television or similar displays.

It is therefore an object of the present invention to provide a shift register-based display system capable of generating and maintaining one- and two-dimensional images.

It is a further object of the present invention to provide such a display system having a gray scale capability.

SUMMARY OF THE INVENTION

The present invention, in preferred embodiment, includes a plurality of plasma shift registers, each of the general type described in the '502 patent and the Ngo application. Advantageously, each of these shift registers is aligned with a first orthogonal coordinate system, e.g., a row of a rectangular matrix. Another gas discharge shift register is positioned along a second orthogonal coordinate direction adjacent one end of the shift registers aligned with the first coordinate direction. Thus, for example, if it is assumed that each of the first plurality of shift registers defines a row in a rectangular matrix, then the second shift register may be considered to be positioned along a column defining the leftmost or rightmost extremity of the matrix. The number of stable discharge sites along the column shift register is conveniently chosen to be equal to twice the number of rows in the matrix. Further, selected ones of the stable discharge site in the column shift register are arranged to be positioned with respect to each row in the matrix such that a discharge transfer may be effected from the column shift register to the adjacent location in a row shift register.

By initiating a discharge at one extremity of the column shift register and by causing this discharge to propagate along the length of the column shift register while also being successively transferred to each row shift register, the discharge is scanned over the entire display matrix. The period for shifting from a stable location in the column shift register adjacent a row shift register to the following stable location in the column shift register adjacent a row shift register is advantageously chosen to be equal to the period required to shift a discharge along an entire row shift register. Appropriate clock signals are applied to each of the row shift registers and the column shift register to effect the desired transfer and propagation.

By applying a digital video signal as a modulating signal superimposed on the normal propagating clock signals, the current flow in a particular discharge cell is correspondingly modulated as that cell is illuminated by the scanning glow discharge. Since, for particular ranges of operating currents, the size of the glow discharge is approximately linearly proportional to the current intensity, the size of a discharge at a selected discharge site is seen to correspond to the applied modulation signal. The impression received by the viewer of the two-dimensional array of shift registers of the present type when video modulation signals are applied is not unlike that associated with a scanning modulated cathode ray tube display system, i.e., the display is similar to standard television displays.

Particular circuitry and structures for effecting the desired glow intensity modulation are also provided.

DETAILED DESCRIPTION

Figure 1:
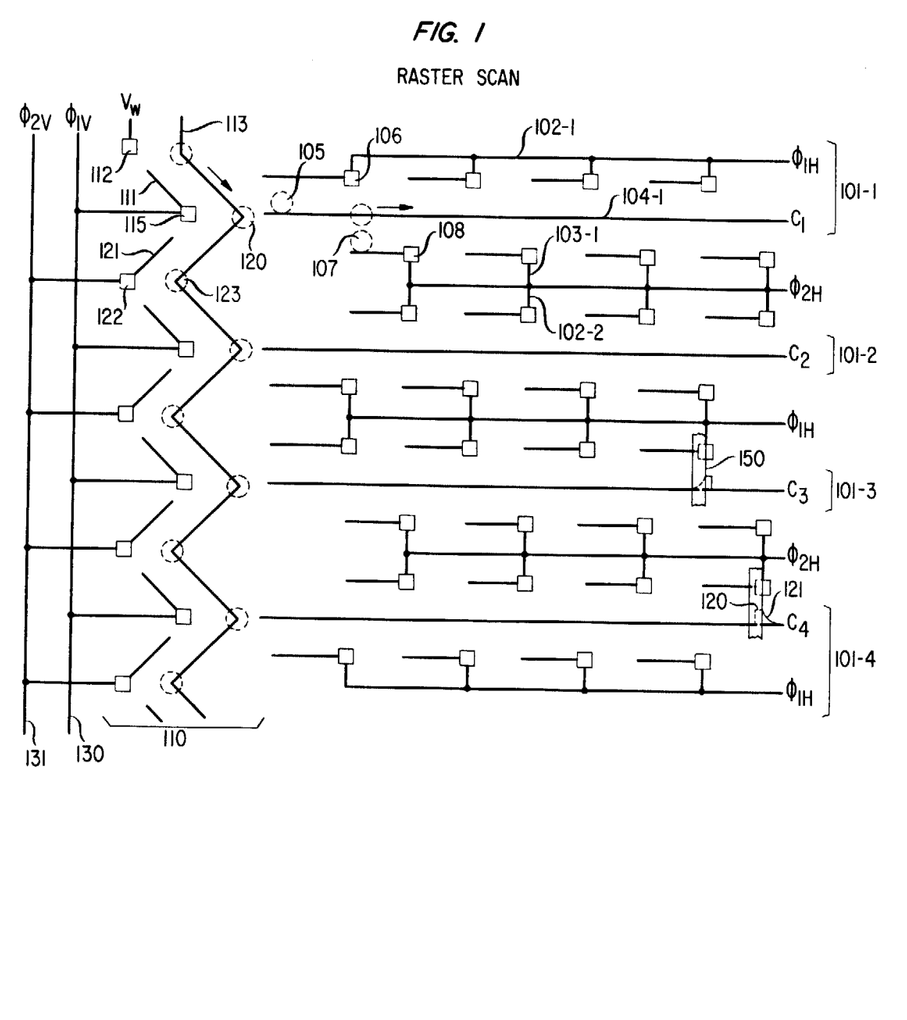
FIG. 1 shows a two-dimensional array of plasma discharge shift registers used in a preferred embodiment of the present invention.

FIG. 1 shows the basic overall structure of a two-dimensional shift register display in accordance with a preferred embodiment of the present invention. In particular, FIG. 1 shows a plurality of shift registers $101-i$, $i = 1,2, \ldots, N$, each of which is advantageously of the type illustrated in FIG. 3 of the '502 patent. For purposes of illustration only, N is taken to be 4 in FIG. 1. There is included in the $i$th shift register a first anode $102-i$, a second anode $103-i$ and a cathode $104-i$.

As will be appreciated from the incorporated '502 patent and Ngo application, a glow discharge occurring at the extreme left of shift register $101-i$, i.e., at the position defined by the glow 105, will be propagated in step-by-step fashion from left to right in FIG. 1 to successive stable positions defined by the anode protuberances such as 106. The points on anode 102-1 like that immediately above the glow 105 are conveniently referred to in the '502 patent, e.g., as pick-up tips, and the positions such as 106 are referred to as the stable discharge sites. The actual structure corresponding to these features is described in greater detail in the '502 patent. By applying suitable clock signals as described in the '502 patent and the Ngo application, a glow passes initially from a pick-up site such as 105 to a stable site such as that associated with anode element 106. During subsequent clock cycles the discharge at site 106 is advantageously transferred to a pick-up site like 107, thence to a stable site like 108.

In such fashion, it is clear that the left to right propagation of a plasma discharge is achieved along shift register 101-1 in FIG. 1 by alternating between one or the other of the anodes 102-1 and 103-1 and the common cathode 104-1. The overall effect on the glow discharge is one of zigzagging above and below the cathode 104-1 while traversing a left to right general direction. Because the anodes $102-i$ and $103-i$ are advantageously positioned in close proximity to the cathode $104-i$, it is not in general possible for the unaided eye to see the up-down component of the motion in the gas discharge propagation.

To simplify interconnections to the anodes for successive rows, it has been found desirable to use a single anode input to connect to the upper anode of a shift register $101-(i + 1)$ and the lower anode of a shift register 101-*i*. Thus, for example, the anode 103-1 is advantageously joined on a single clock bus with anode 102-2.

Also shown in FIG. 1 is a vertical shift register 110 having N stable positions. The configuration chosen for the shift register 110 is advantageously of the general type identified in FIG. 1 of the '502 patent. A principal distinguishing characteristic of the shift register 110 as contrasted with the shift registers 101-*i* is that the shift register 110 has anodes on only one side of its cathode, 113, while the registers 101-*i* have anodes on both sides of cathode 104-*i*. The effect of this unilateral anode positioning in shift register 110 is to confine the glow discharge to a more or less constant distance from cathode 113. No zigzagging to positions on alternate sides of cathode 113, like that associated with shift registers 101-*i*, occurs in shift register 110.

While the functioning of shift register 110 is substantially identical to that shown in FIG. 1 of the '502 patent, the exact shape and positioning of the electrodes will be seen to have been changed. For reasons that will become apparent in the description below, the cathode 113 has been formed in a sawtooth shape, with stable state locations, e.g., 120 or 123, occurring at the "tooth" extremeties. Stable discharge location 120 and other alternate stable locations are arranged to be adjacent respective cathodes 104-*i* of shift registers 101-*i*.

The anodes for the shift register 110 are again segmented into two pluralities of pick-up tips and associated stable discharge location elements. A first plurality of pick-up tips and stable discharge sites are connected to a first anode bus 130 for connection to $\Phi_{1V}$ clock signals having the form shown in FIG. 2. The remaining pick-up tips and stable location sites are connected to a second anode bus 131 for connection to $\Phi_{2V}$ clock signals, also shown in FIG. 2.

In operation, pick-up tip 111 is arranged to receive a glow discharge resulting from the application of a write signal $V_w$ (having the form shown in FIG. 2) at write anode 112. The glow discharge between anode 112 and the uppermost portion of cathode 113 remains for the duration of the positive $V_w$ pulse and permits, by the well-known glow priming mechanism, the establishment of a glow discharge between the pick-up tip 111 and cathode 113 during the immediately following interval. The glow discharge received at pick-up tip 111 is, according with the teachings of the '502 patent and the Ngo application, caused to propagate along cathode 113 to a first stable location to the right of position 115 on anode 130 of shift register 110. The discharge 120 between cathode 113 and anode position 115 is also advantageously positioned such that it may, by the application of appropriate potentials, be attracted by the pick-up tip adjacent discharge site 105, thereby to cause a glow to originate at site 105 at the extreme left of shift register 101-1.

Anode position 115 is therefore seen to function, in part, in substantially the same manner as a standard write element. The transfer of a glow discharge from one shift register to another is discussed further in the Ngo application. It will be appreciated from the '502 patent and the Ngo application that the glow transfer occurs in large part because of the priming effect caused by the discharge at the "transferor" location. That is, the discharge at location 120 gives rise to a localized atmosphere of photoelectrons and other charged particles which serve to prime a discharge at pick-up tip 105. When normal propagation potentials are applied in the presence of such priming between pick-up tip 105 and cathode 104-1 a discharge is realized between these latter two elements. The priming, or transferor, discharge is, of course, unaffected by the newly created discharge at the "transferee" site, i.e., two discharges, the original and the transferred discharge, are present after a transfer is accomplished. In practical realizations, it proves convenient to pass the glow discharge to a new location in the column shift register 110 concurrently with a transfer to a row shift register 101-*i* as reflected by the clock pulse timing shown in FIG. 2. This is similar to the time relation between the write pulse and the propagation clock pulses in FIG. 2 of the '502 patent.

During subsequent column clock pulse intervals, then, the glow at site 120 is caused to pass by way of pick-up tip 121 adjacent stable discharge location 122 on anode 131, and the corresponding position 123 adjacent cathode 113. This latter propagation increment is, of course, accomplished in response to the application of the $\Phi_{2V}$ signals shown in FIG. 2. The discharge location 123 defined by anode position 122 and the adjacent position on cathode 113 is not sufficiently close to any of the pick-up tips at the leftmost extremeties of the shift registers 101-*i* to encourage or prime a breakdown at any of these latter pick-up tips. Accordingly, no transfer from the vertical shift register 110 to one of the horizontal shift registers 101-*i* is accomplished while the glow discharge is at one of the positions defined by a leftmost tip of the cathode 113, i.e., while at a location like 123.

Figure 2:
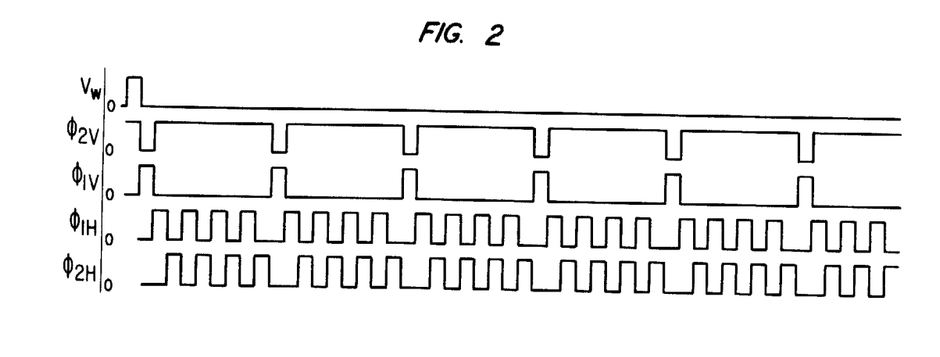
FIG. 2 shows clock signals useful for operating the display matrix of FIG. 1.

While the glow discharge in the vertical shift register 110 is at one of the last-mentioned positions, clock signals applied to the shift registers 101-*i* cause a glow discharge established at a leftmost pick-up tip to be propagated in a left-to-right fashion along the shift registers 101-*i*. Waveforms designated $\Phi_{1H}$ and $\Phi_{2H}$ in FIG. 2 are suitable for this purpose. Note that the horizontal propagation signals $\Phi_{1H}$ and $\Phi_{2H}$, alternate 8 times during the time that the vertical propagation signals, $\Phi_{1V}$ and $\Phi_{2V}$. This relation between the repetition rates follows simply from the fact that eight stable discharge locations per line have been assumed. In general, the horizontal rate will be L times faster than the vertical rate when there are L stable discharge locations per lines.

As should be clear from the foregoing description, there is no benefit gained from having the glow discharge remain at a rightmost stable location such as 120 in the vertical shift register 110 for any but a brief transition period. Thus, the $\Phi_{1V}$ waveform in FIG. 2 may assume the form of a short positive pulse to create the discharge suitable to effect the glow transfer to one of the row (horizontal) shift registers 101-*i*. The longer positive pulses included in the $\Phi_{2V}$ waveform are suitable for moving the discharge in the column shift register 110 to a position like 123, which is more remote from the registers 101-*i*. The duration of a discharge at a rightmost location of shift register 110 need only extend for one row shift register clock period. This sequence of column clock pulses and the related horizontal register clock pulse sequences are summarized in FIG. 2. As in the case of the shift registers in the '502 patent and the Ngo application, a glow propagated to the extreme right of one of the shift registers 101-*i* will be self extinguishing.

The actual drive circuits for supplying the various clock pulse sequences are well known in the art. In general, those pulse sources used to drive prior art d.c. plasma displays are suitable, when gated in accordance with the signals in FIG. 2, for application to the various electrodes shown in FIG. 1.

The above descriptions permit one skilled in the art to generate a two-dimensional display featuring a scanned light pulse which appears first at the upper lefthand corner and proceeds initially to the upper righthand corner. This left-to-right scan continues on a line-by-line basis until the glow discharge reaches the lower righthand corner. Through the application of another write pulse at the write electrode 112, the entire process is repeated.

Figure 3:
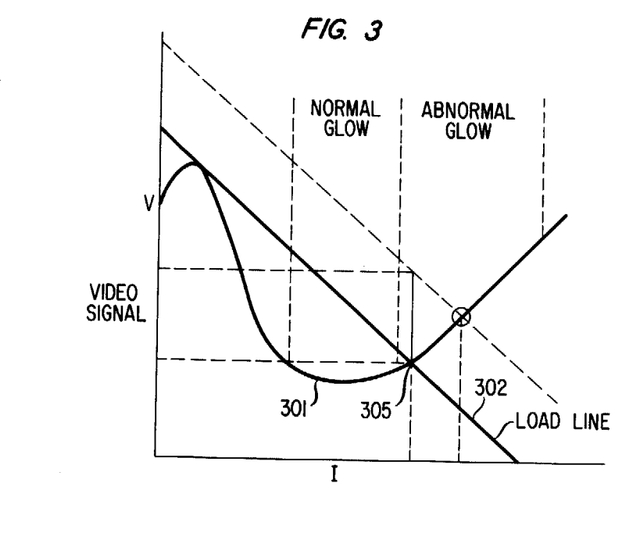
FIG. 3 shows the relation between applied voltage and resulting discharge current in a plasma cell of the type used in the structure shown in FIG. 1.

To realize an information bearing display it is, of course, necessary to selectively activate the individual discharge sites. Toward this end, it is profitable to review the well-known relation between voltage and current in a plasma discharge cell illustrated by curve 301 in FIG. 3. As shown in FIG. 3, there is an area of so-called normal glow conditions where the V/I curve is essentially flat, i.e, the voltage across a plasma cell has substantially no effect on the cell current and, hence, glow brightness. Over another range (indicated in FIG. 3 as the abnormal glow range), however, the current is roughly linearly proportional to the applied voltage. Thus, when a suitable resistive load, corresponding to load line 302 in FIG. 3, is connected in series with a discharge cell, it is possible to vary cell current and glow brightness in an approximately linear fashion by simply varying the applied cell voltage.

Thus if a video signal is additively combined with the normal propagation signal for the row shift registers 101-$i$ in FIG. 1, a scanning pulse varying in brightness according to the amplitude of the applied video signal will be realized. Care need only be taken that the composite voltage does not fall below the sustain level necessary to propagate the scanning pulse. A suitable quiescent operating point is indicated in FIG. 3 by the designation 305.

Figure 4:
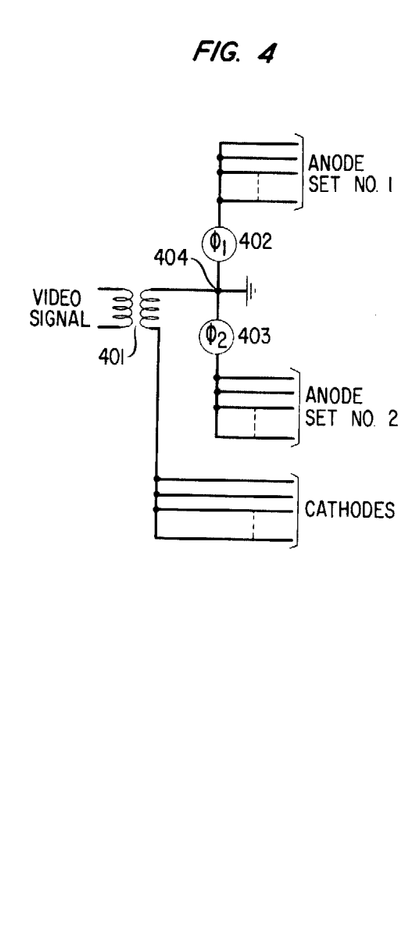
FIG. 4 is a schematic representation of circuitry for applying an additive video signal in series with normal propagation clock signals used in the system of FIG. 1.

FIG. 4 shows circuitry suitable for effecting the required additive combination of video and normal sustain (propagation) clock signals. There, $\Phi_{1H}$ and $\Phi_{2H}$ clock pulse generators 402 and 403, respectively, with pulse amplitudes equal to the voltage at the quiescent point 305 shown in FIG. 3 are connected to the first and second sets of anodes, i.e., those previously indicated as being connected to the $\Phi_{1H}$ and $\Phi_{2H}$ sources. The input video signal (conveniently biased to have all positive values) is coupled via transformer 401 between the ground or reference point connection 404 and the several cathodes in the row registers 101-$i$, i.e., the elements 104-$i$ in FIG. 1. It also proves convenient to limit the magnitude of the applied video signal to confine the cell voltage to the desired abnormal glow range. Without the video addition, the cathodes would ordinarily be connected to reference point 404.

Because the present invention relies on a cell-by-cell transfer of a glow discharge, it is not possible for the glow to be completely extinguished while traversing a matrix row, i.e., while it is being modulated by a video signal. The only relevant consequence of this fact is that there is, using the structure of FIGS. 1 and 4, no way to realize a completely dark cell. Fortunately, however, glow brightness resulting from the structure described above is dependent on the glow size; high brightness (resulting from large currents) corresponds to a more complete filling of the area between cathode and anode than low brightness. Actually, the size of the glow brightness is a consequence of the observed fact that the current density J is constant over the relevant operating range. Since $J = I/A$, where $I$ is cell current and $A$ is the area of the cathode used by a cell in the structure of FIG. 1, an increase in current causes an increase in the cathode area employed at a cell.

Through the simple expedient of using an opaque mask to partially cover a cell, the light from the small discharge area associated with a discharge of lower intensity may be effectively blocked. When a larger glow, associated with a higher current is applied, the glow exceeds the physical boundaries of the mask and becomes visible. The viewed brightness of a discharge is thereby proportional to the applied signal, but is subject to a thresholding related to the quiescent brightness for an unmodulated propagate signal.

Cathode shaping may advantageously be introduced to more completely control the point of the small (low current level) discharge and the associated spreading to generate the larger discharge. As will be discussed more fully in connection with FIG. 6, a small closely placed (relative to an associated anode location) cathode portion (such as "plateau" 120 in FIG. 1) is used to define the masked, low level discharge, while a gradually sloping "hill" portion (such as 121 in FIG. 1) accommodates increasingly large glow discharges.

A portion of a mask 125 suitable for functioning in the manner outlined above is shown superimposed on the lower righthand portion of FIG. 1. Similar mask portions are advantageously placed adjacent each stable discharge location. The mask may advantageously be evaporated in a standard manner on the glass envelope enclosing the entire structure shown in FIG. 1. The masking also advantageously covers the entire shift register 110, which includes no viewable information.

Figure 5:
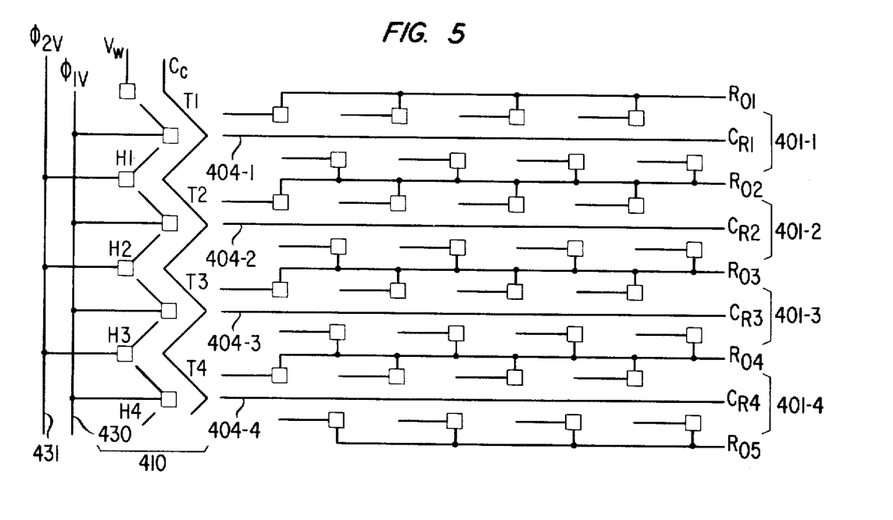
FIG. 5 shows a structure based on that of FIG. 1, which includes modifications to facilitate interlaced scanning.

A common technique used in commercial television systems is that of interlaced scanning, whereby a complete television frame comprises two successive half frames, one including only odd-numbered scan lines and the other including only even-numbered scan lines. FIG. 5 shows an adaptation of the structure of FIG. 1 to permit interlaced scan operation of a plasma display panel comprising a plurality of plasma discharge shift registers.

The structure shown in FIG. 5 includes column shift register 410 of substantially the same type as the corresponding column shift register 110 shown in FIG. 1. Likewise, the shift signals impressed on the $\Phi_{1V}$ and $\Phi_{2V}$ buses 430 and 431 are of the same form as are used in the FIG. 1 system. These clock signals are substantially identical to those shown in FIG. 2, again assuming a row including eight stable discharge locations.

The row shift registers shown in FIG. 5 are somewhat different in detailed placement of pickup tips and stable discharge locations. Thus, while the cathode structures 404-$i$ are again each placed opposite on the tip of a rightmost sawtooth of shift register 410, the distribution of the anode elements is somewhat different from that shown in FIG. 1. In particular, each pickup tip adjacent a sawtooth tip of shift register 410 is one that is above its associated cathode. Thus a glow transfer from column register 410 to one of the row registers 401-$i$, $i = 1, 2, 3, 4$, always occurs to a location above the cathode of the row register.

To effect a scan over the odd lines, clock signals having the form of the $\Phi_{1H}$ signals shown in FIG. 2 are applied to the odd row anodes, i.e., $R_{01}, R_{03}, \ldots, R_{0(N-1)}$, where N is an even number equal to the number of row shift registers. Clock signals having the form of the $\Phi_{2H}$ signals shown in FIG. 2 are then applied to all of the even row anodes, i.e., $R_{02}, R_{04}, \ldots, R_{0N}$. It will be appreciated that a glow transfer readily occurs whenever a glow in column shift 410 appears adjacent an odd-numbered cathode such as $C_{R1}, C_{R3}, \ldots, C_{R(N-1)}$ because of the correct polarity of the $\Phi_{1H}$ shift signals. No transfer to an even-numbered row occurs because the polarity of the $\Phi_{2H}$ signals applied to the even row anode pickup tips nearest column shift register 410 is not positive at the time a glow is presented for transfer. Thus the even rows are not called upon to propagate a glow discharge under the shift signal regime described above.

After the odd line scan is complete, a reversal of the clock signal polarity is conveniently effected. That is, the high level is substituted for the low level and the low level is substituted for the high level. The column shift register clock signals $\Phi_{1V}$ and $\Phi_{2V}$ remain unchanged and are of the same form as those shown in FIG. 2. In effect, then, the original $\Phi_{1H}$ signal is applied to the even anode of the row shift registers, and the original $\Phi_{2H}$ signal is applied to the odd anodes of the row shift registers. As noted above, the $\Phi_{1H}$ signal is appropriate for permitting a glow transfer from the column shift register to row shift registers. Thus, only even row shift registers, i.e., those associated with even numbered cathodes, receive a glow transfer and are required to shift the glow in a left to right direction.

Since only half of the rows contribute to a scan during each column shift register scan, the scan rate of the column shift register 410 must be twice as high as for the non-interlaced scan case for a given frame rate. The column write pulse rate likewise must be doubled as compared with that shown in FIG. 2.

The alternation of the row shift register clock signals described above may easily be effected at logic levels, i.e., the $\Phi_1$ and $\Phi_2$ clock signal sources 402 and 403 shown in FIG. 4 may be taken as representative of high current drivers controlled by logic level signals having the form (alternately) of the $\Phi_{1H}$ and $\Phi_{2H}$ signals shown in FIG. 2. Of course, when the $\Phi_1$ driver is controlled by the $\Phi_{1H}$ signals, the $\Phi_2$ driver is controlled by the $\Phi_{2H}$ signals and vice versa.

Gray scale modulation is effected in a system based on the structure of FIG. 5 in exactly the same manner as shown in FIG. 4. Anode set 1 corresponds, of course, to the odd-numbered anodes and anode set 2 to the even-numbered anodes.

Figure 6:
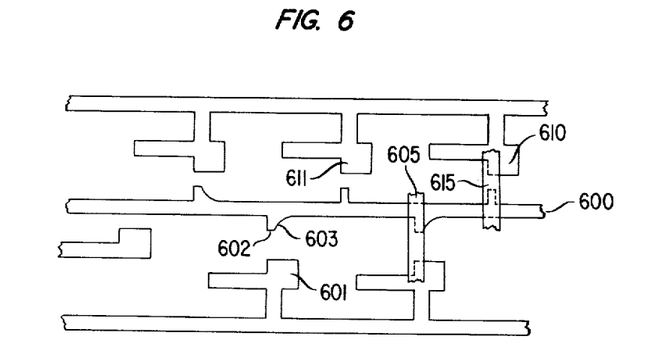
FIG. 6 shows a modified cathode structure for shift registers of the type illustrated generally in FIGS. 1 and 5.

While modulation resulting from the addition of normal shift pulses and a video signal permits a wide range of continuously variable brightness to be achieved, not all display applications require such continuously variable brightness. FIG. 6 shows structure suitable for achieving two-level brightness as well as the previously described continuously variable brightness.

As noted above, the current density $J = I/A$ in a glow discharge tends to remain constant. Thus for small current the required cathode element need only be small, while a larger cathode is required for higher current. To provide specifically for continuous level brightness, there is included in the structure of FIG. 6 at stable discharge anode element 601, a cathode including a protuberance having a portion 602 which is relatively close to anode segment 601 and a larger cathode area 603 which is relatively more remote from segment 601. Cathode portion 603 corresponds to the previously described "hill" portion 121 in FIG. 1.

When a low level current accompanies a gas discharge between anode element 601 and cathode 600 the discharge takes place in the volume between 601 and the portion 602 of the cathode protuberance. When, however, the discharge current is high, and in order to maintain the current density constant, the glow spreads over an area of the cathode 600 which includes that adjacent 602 and the larger area 603. The degree of spread over increasingly more remote (relative to anode segment 601) points on the hill portion 603 depends, of course, on the magnitude of the discharge current.

To encourage the aforementioned two-level brightness, all that remains is to cause the hill portion of each cathode protuberance to have a very steep slope. In the ultimate case, the hill portion may be completely eliminated as shown in connection with the cathode portion adjacent anode segments 610 and 611. The total absence of a hill portion simplifies the actual fabrication of the cathode protuberances, by reducing the number of film levels needed to approximate the linear or other slope.

By masking the area of the envelope of the panel which covers only the plateau portions of the protuberances like 602 in FIG. 6 (and the associated anode areas), a display is readily generated which results from visible discharges only at cells having higher level currents. Such a typical mask is indicated by 605 in FIG. 6 for the continuously variable brightness case. A similar partial mask 615 is shown adjacent a "two-level" brightness location adjacent anode segment 610. Thus if binary information representative of a two-level picture or other graphical entity is used to modulate the shift pulse magnitudes for row shift registers having the form shown in FIG. 6, a high contrast two-level representation of the picture is obtained. While both continuously variable and two-level structures are shown in FIG. 6, in general, only one type of such structure is advantageously included in a given shift register to be incorporated in a display system.

The row shift register structure of FIG. 6 can, of course, be introduced in either of the structures shown in FIGS. 1 and 5, or in any variation of these shift registers shown in the '502 patent or the Ngo application. That is, the use of cathode elements having more than one effective size to control the size of a glow will also find application in other than two dimensional scanning contexts. The continuously variable brightness and bilevel brightness techniques, and associated masking, are equally useful in single shift register structures. Thus, e.g., the shift registers, including bidirectional shift registers, described in the Ngo application, may use the modified cathode structures to advantage. Structures in which scanning on a few closely spaced row shift registers proceeds at the same rate and beginning at the same point in space and time may also use such bilevel techniques.

While interlaced scanning involving two half scans has been described above, scanning involving three or more partial scans may be used where appropriate. An obvious repetitive permutation of three or more phases of clock signals will yield such results. The multiphase clock signals and associated structures described in the Ngo application are appropriate for such purposes.

While rows including a relatively small number of discharge locations have been used by way of example, any reasonable number of locations can be included in a row. When a large number of locations are included in each row, and/or the number of rows is large, it proves convenient to segment the rows into S subsets, each of which is associated with a separate column shift register. Thus S rows are scanned simultaneously, one in each set.

Figure 7:
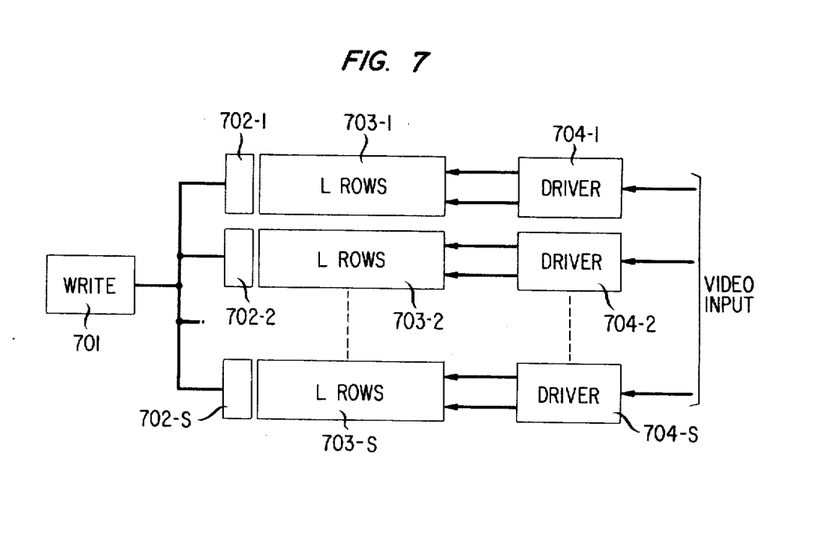
FIG. 7 illustrates one manner of introducing multiplexing into display systems including shift registers of the type illustrated in FIGS. 1 and 5.

FIG. 7 illustrates a system based on the above general method of operation. A write (vertical sync) signal is applied by write circuit 701 to each of S column shift registers 702-$i$, $i = 1, 2, \ldots, S$, each having 2L stable discharge locations. Each of these latter shift registers is coupled in the manner described above to a respective set of L row shift registers 703-$i$, $i = 1, 2, \ldots, S$. The row shift registers then propagate a received glow discharge from left to right under the control of respective drivers 704-$i$, $i = 1, 2, \ldots, S$. These drivers are, in turn, modulated in the manner shown in FIG. 4 by input video signals. Since each L-row subset displays only a portion of the image to appear on the panel viewing surface, only information corresponding to that portion of an image is supplied to the associated driver. That is, the input video signal is segmented in straightforward fashion, with each segment corresponding to a part of an image being applied as modulation signals to a part of the panel.

Though it has been assumed that visible glows are to be directly viewed in the various shift register configurations described above, it often proves convenient to have individual display cells emit light of a color other than that characteristic of the gas confined between the various electrode spaces. Thus in accordance with another aspect of the present invention it proves convenient to deposit by standard techniques a phosphor "mask" covering the nominally unmasked portions of a stable discharge site. Thus when an otherwise visible (non-opaquely masked) glow discharge occurs, it stimulates the phosphor coating to emit a colored glow characteristic of the phosphor. Such a phosphor coating is illustrated by the covering layer 150 in FIG. 1. For simplicity of illustration, the opaque mask at the same stable discharge location has been omitted.

By the simple expedient of having phosphor layers associated with each of three primary colors, e.g., red, green and blue, deposited on respective ones of each set of 3 consecutive row shift registers such as 101-$i$ in FIG. 1, it is possible to realize a true arbitrarily colored image. All that is required is to have each of the three lines in each set scanned simultaneously, with each line being modulated as described above by a corresponding video signal component. Thus lines 1, 4, 7, etc., may be modulated by the red video component; lines 2, 5, 8, etc., by the green component; and lines 3, 6, 9, etc., by the blue component. The scanning of lines 1, 2, and 3 during one interval and 4, 5, and 6 during the next interval, etc., may be accomplished by having three separate column shift registers, such as 110 in FIG. 1, each coupled to a respective one of each set of three consecutive row shift registers.

While the designations "row" and "column" have been used above, it should be understood that these imply no absolute orientation of the various elements. Thus these terms may be interchanged or different direction indicating terms, e.g., radial coordinates for "rows" positioned as spokes of a wheel relative to a "column" located as a hub to such a wheel. Further, the number of rows and/or columns used by way of illustration should in no way be considered limiting.

What is claimed is:

1. A two-dimensional graphical display system comprising
   a first set of S plasma discharge shift registers where $S \geq 1$, each of said shift registers in said first set including a plurality of ordered stable discharge locations,
   a second set of LS ordered plasma discharge shift registers, $L \geq 2$, each of said shift registers in said second set including N ordered stable discharge locations, and each being coupled to a given one of said stable discharge locations in one of said shift registers in said first set in such manner that a glow discharge occurring at said given stable discharge locations in said first set may be non-destructively transferred to the first of said N stable discharge locations,
   means for sequentially propagating a glow discharge along each of said first set of plasma discharge shift registers, and
   means for propagating a transferred glow discharge along each of said second set of shift registers,
   whereby S scanning glow discharges are propagated over said second set of shift registers.

2. Apparatus according to claim 1 further comprising means for scanning alternately over even- and odd-numbered shift registers in said second set of shift registers.

3. Apparatus according to claim 1 wherein said first set includes one plasma discharge shift register.

4. Apparatus according to claim 3 wherein said one shift register in said first set includes 2L stable discharge locations, L of which are coupled to respective shift registers in said second set.

5. Apparatus according to claim 1 wherein said means for propagating a transferred glow discharge along each of said second set of shift registers comprises means for modulating the intensity of the brightness of said glow discharge in accordance with an applied video signal.

6. Apparatus according to claim 5 wherein said means for modulating comprises means for varying the level of current associated with said glow discharge in accordance with said applied video signal.

7. Apparatus according to claim 6 further comprising means for optically masking at each stable discharge location the glow discharge associated with a current below a prescribed level but above the level required to permit subsequent propagation.

8. Apparatus according to claim 1 wherein each of said shift registers in said second set comprises
   a substantially planar substrate,
   a plurality of interleaved sets of electrically conducting paths positioned on said substrate,
   a unitary conducting path positioned on said substrate in spaced-apart relation to each of said paths in said sets of paths,
   each of said paths in said plurality of sets of paths having a region defining a stable discharge location between that path and said unitary path and a region defining an unstable discharge location adjacent said stable discharge location,
   means for applying a sequence of potential differences between said unitary paths and respective ones of said sets of paths, thereby to establish and propagate a glow discharge through successive unstable and stable discharge locations,
   either or both of said unitary path or said plurality of paths having a plurality of subdivisions at each stable discharge location, the number of subdivisions active in supporting a stable glow discharge being related to the level of current in that glow discharge.

9. Apparatus according to claim 8 further comprising means for modifying the level of current in a discharge in relation to an applied video signal, said video signal being synchronized with the propagating of a glow discharge.

10. Apparatus according to claim 9 wherein each stable discharge location comprises first and second subdivisions, said first of said subdivisions arranged to be active for discharge currents below a prescribed level and both of said subdivisions being active for discharge currents above said prescribed level.

11. Apparatus according to claim 10 further comprising at each stable discharge location means overlaying said first subdivision for optically masking the glow discharge at said first subdivision.

12. Apparatus according to claim 10 wherein said second subdivision is active in supporting a glow discharge which is substantially proportional in size to the amount by which said discharge current exceeds said prescribed level.

13. Apparatus according to claim 12 further comprising at each stable discharge location means overlaying said first subdivision for optically masking glow discharges at said first subdivision.

14. Apparatus according to claim 13 further comprising light emitting means responsive to said glow discharge at said second subdivision comprising a phosphor layer adjacent said second subdivision.

15. Apparatus according to claim 14 wherein said phosphor at corresponding stable discharge locations in each shift register in consecutive sets of three shift registers each corresponds to a different primary color, and wherein S = 3.

16. Apparatus according to claim 15 wherein
the first of said shift registers in said first set is coupled to each third shift register in said second set, beginning with the first shift register in said second set,
the second shift register in said first set is coupled to each third shift register in said second set, beginning with the second shift register in said second set, and
the third shift register in said first set is coupled to each third shift register in said second set, beginning with the third shift register in said second set.

17. In apparatus for propagating a gaseous discharge comprising
a substantially planar substrate,
a plurality of interleaved sets of electrically conducting paths positioned on said substrate,
a unitary conducting path positioned on said substrate in spaced-apart relation to each of said paths in said sets of paths,
each of said paths in said plurality of sets of paths having a region defining a stable discharge location between that path and said unitary path and a region defining an unstable discharge location adjacent said stable discharge location,
means for applying a sequence of potential differences between said unitary paths and respective ones of said sets of paths, thereby to establish and propagate a glow discharge through successive unstable and stable discharge locations,
the improvement comprising a modified conductor structure having a plurality of subdivisions at each stable discharge location, the number of subdivisions active in supporting a stable glow discharge being directly related to the level of current in that glow discharge.

18. Apparatus according to claim 17 further comprising means for modifying the level of current in a discharge in relation to an applied video signal, said video signal being synchronized with the propagating of a glow discharge.

19. Apparatus according to claim 18 wherein each stable discharge location comprises first and second subdivisions, a first of said subdivisions being active for discharge currents below a prescribed level and both of said subdivisions being active for discharge currents above said prescribed level.

20. Apparatus according to claim 19 further comprising at each stable discharge location means overlaying said first subdivisions for optically masking the glow discharge at said first subdivision.

21. Apparatus according to claim 20 wherein said second subdivision is active in supporting a glow discharge which is substantially proportional in size to the amount by which said discharge current exceeds said prescribed level.

* * * * *